United States Patent [19]

Delignieres

[11] 4,187,492
[45] Feb. 5, 1980

[54] DEVICE FOR DETERMINING THE RELATIVE POSITION OF ELONGATE MEMBERS TOWED BEHIND A SHIP

[75] Inventor: Robert Delignieres, Mareil Marly, France

[73] Assignee: Institut Francais du Petrole, France

[21] Appl. No.: 850,835

[22] Filed: Nov. 11, 1977

[30] Foreign Application Priority Data

Nov. 18, 1976 [FR] France ................. 76 35162

[51] Int. Cl.² .......................................... G01V 1/38
[52] U.S. Cl. ...................................... 367/127; 367/19
[58] Field of Search ................. 340/3 T, 7 R, 16 R, 340/566; 343/112 D, 112 TC

[56] References Cited

U.S. PATENT DOCUMENTS

| 3,076,519 | 2/1963 | Alsabrook | 340/7 PC |
| 3,414,874 | 12/1968 | McLoad | 340/7 R |
| 3,633,204 | 1/1972 | Earp et al. | 343/112 D |
| 3,775,737 | 11/1973 | Laurent | 340/7 R |
| 3,816,832 | 6/1974 | Elwood | 343/112 D |
| 3,831,136 | 8/1974 | Sagoci | 340/7 R |
| 3,840,845 | 10/1974 | Brown | 340/7 R |
| 3,868,692 | 2/1975 | Woodard et al. | 343/112 D |
| 4,001,771 | 1/1977 | Amrine et al. | 340/566 |
| 4,011,540 | 3/1977 | Farr | 340/3 T |
| 4,037,189 | 7/1977 | Ball et al. | 340/3 T |
| 4,063,213 | 12/1977 | Itria et al. | 340/7 PC |

Primary Examiner—Nelson Moskowitz
Attorney, Agent, or Firm—Craig and Antonelli

[57] ABSTRACT

Device for determining the relative position of at least one seismic streamer comprising acoustic pulse sensors, with respect to a seismic streamer comprising acoustic pulse transmitters, all of said streamers being towed behind a ship, comprising a telemetrical system for measuring the distance between pulse sensors and pulse transmitters by the determination of the travel time of pulses between different pulse transmitters and corresponding pulse sensors and a viewing system for displaying the so-measured distance.

10 Claims, 11 Drawing Figures

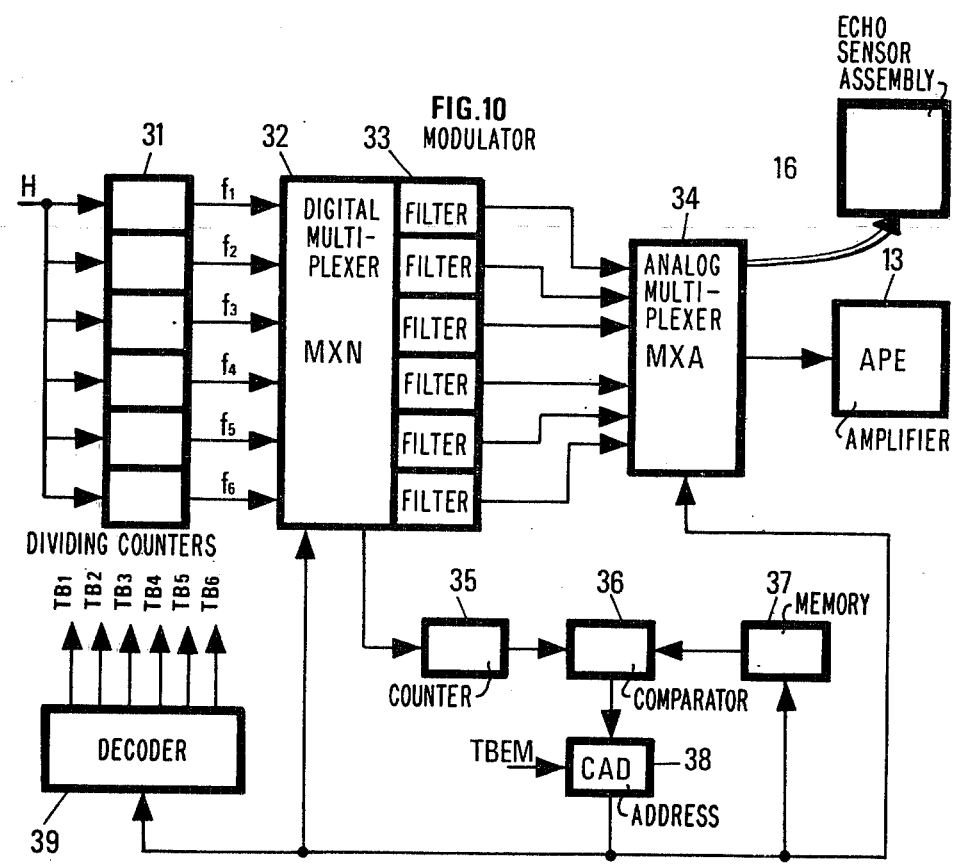
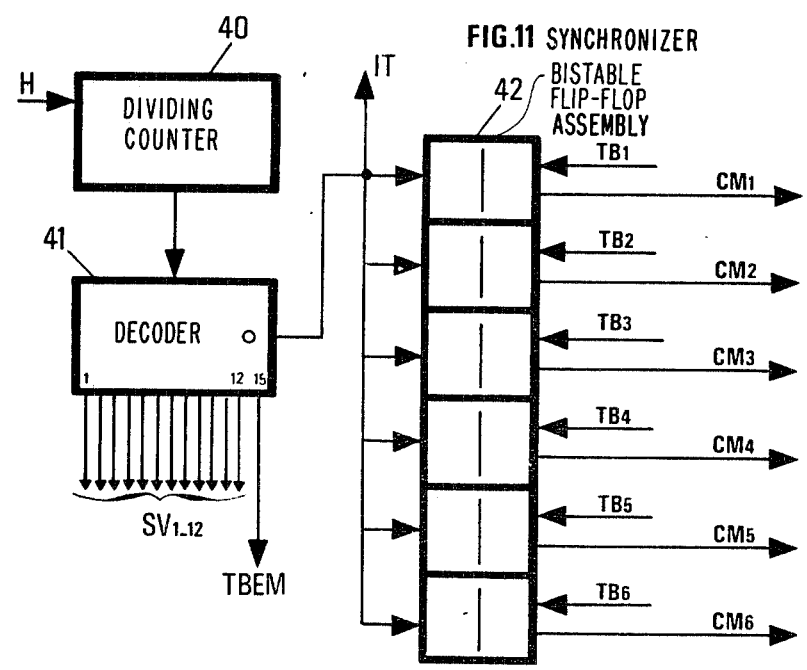

DEVICE FOR DETERMINING THE RELATIVE POSITION OF ELONGATE MEMBERS TOWED BEHIND A SHIP

The invention relates to a device for determining the relative position of at least two elongate members towed behind a ship.

It relates more particularly to a device comprising an acoustic telemetric system for determining, at several different points, the spacings between seismic streamers towed from a surface ship.

The device comprises acoustic wave transmission means associated to one of said members, means for receiving acoustic pulses, associated to the other member and a telemetry system for measuring the relative distance between the transmission means and the reception means by determining the travel time intervals of acoustic pulses between said transmission means and said reception means.

The transmission means comprise preferably a plurality of transmitting devices distributed along one of said elements, a system for generating a sequence of transmission signals and means for transferring the transmission signals respectively to the transmitting devices. Similarly, the reception means comprise a plurality of receiving devices distributed along the other element.

According to a particular embodiment, each transmitting device is adapted to selectively transmit signals at a determined frequency and each receiving device is adapted to selectively sense signals issued from a single transmitting device.

The different devices associated to one element may be interconnected in parallel. Moreover, when the transmitting and receiving devices comprise elements adapted to reversible operation, the plurality of devices distributed along each elongate member may be equally used for transmission or reception. Their function will depend on their connection to an electronic control or operation system.

Other features and advantages will be made apparent from the following description of a non-limitative embodiment of the device, given with reference with the accompanying drawings, wherein:

FIG. 1 shows an assembly of three elongate members towed behind a ship;

FIG. 2 diagrammatically shows an assembly of transducers connected in parallel;

Figure 5:
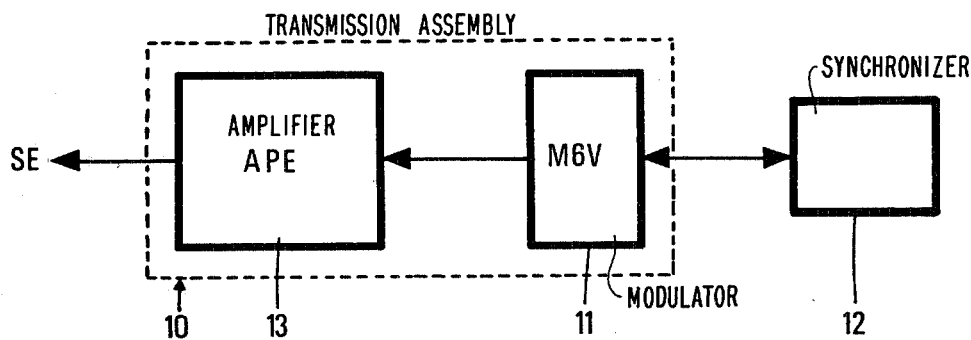
Figure 6:
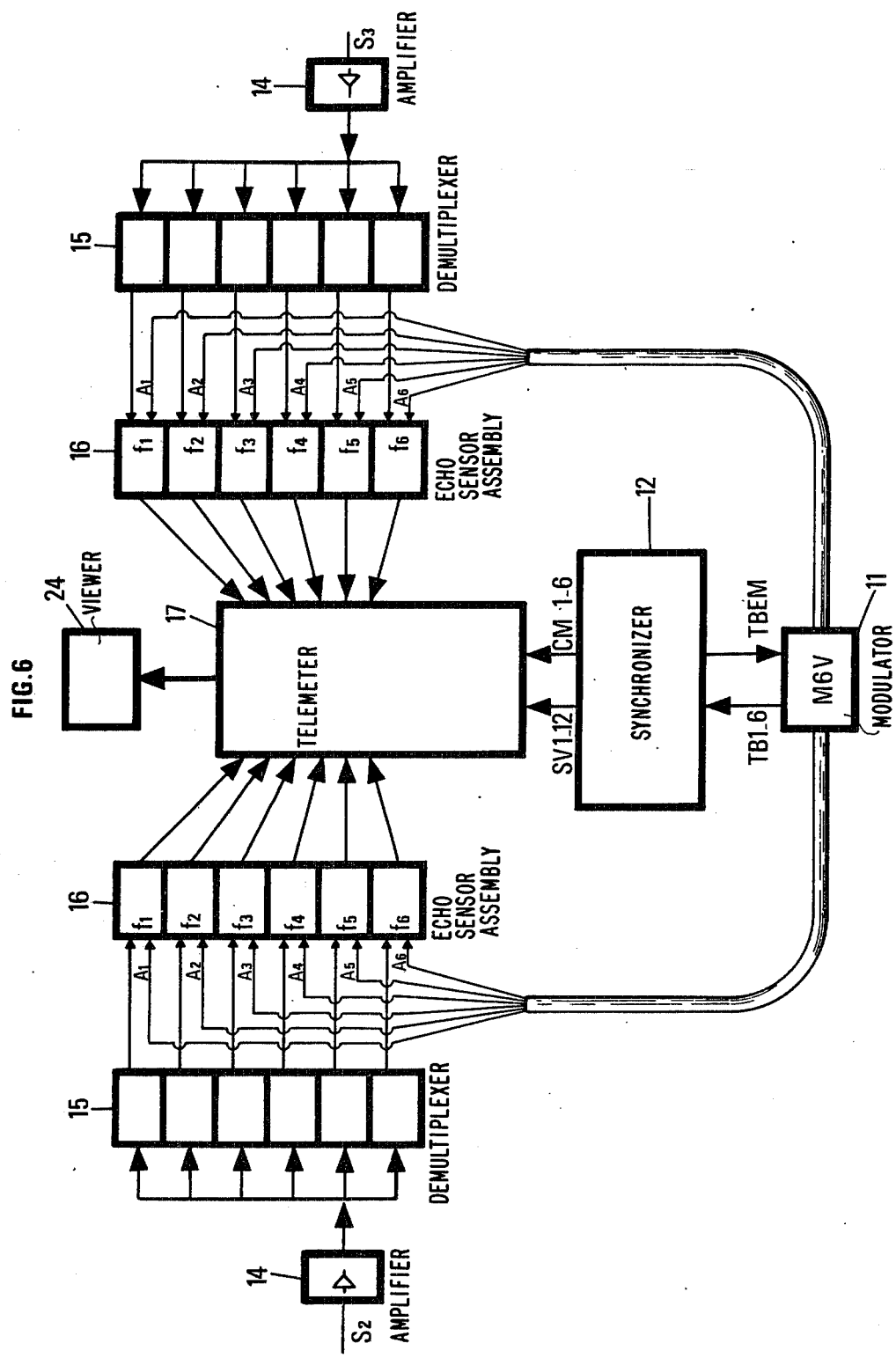
Figure 7:
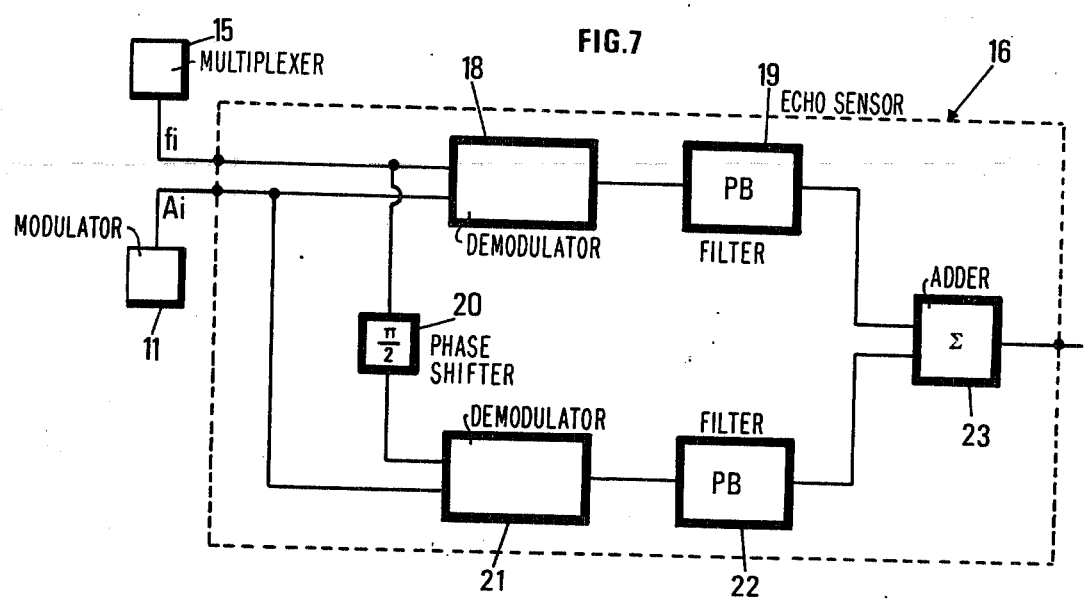
Figure 8:
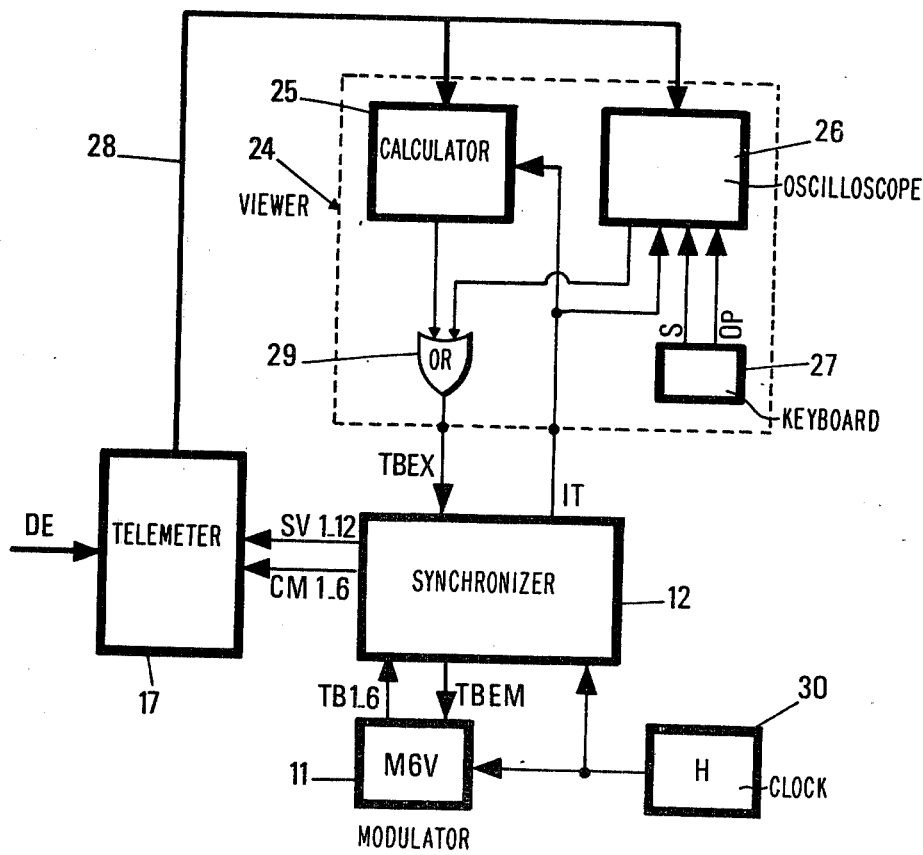
Figure 9:
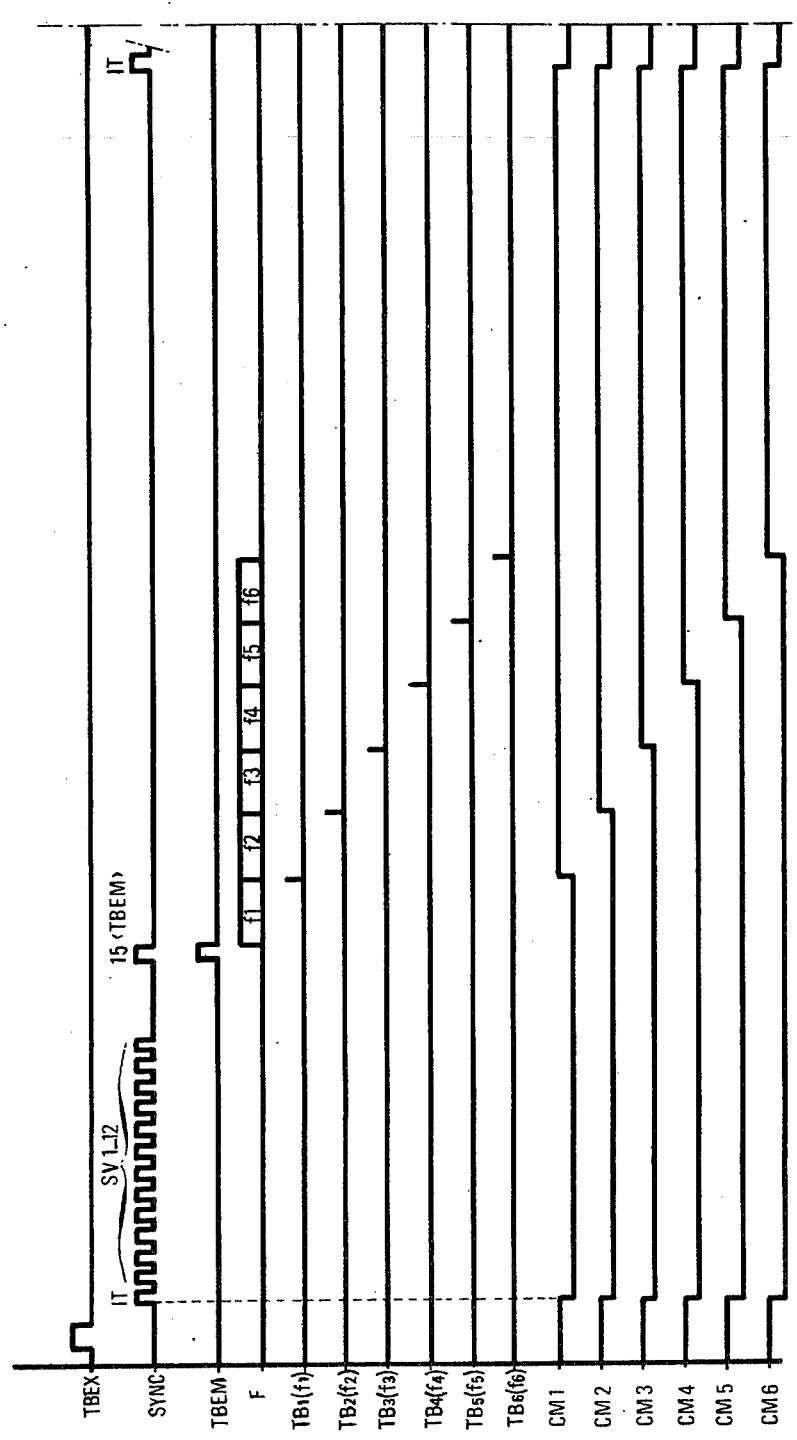

FIG. 5 diagrammatically shows a transmission device;

FIG. 6 is a synoptic diagram of a reception device;

FIG. 7 diagrammatically shows an echo sensor;

FIG. 8 diagrammatically shows a system for viewing and processing telemetrical data;

FIG. 9 shows a chromogram of signals produced by a modulator and a synchronizer;

FIG. 10 is a synoptic diagram of a modulator;

FIG. 11 diagrammatically shows the synchronizer.

Figure 1:
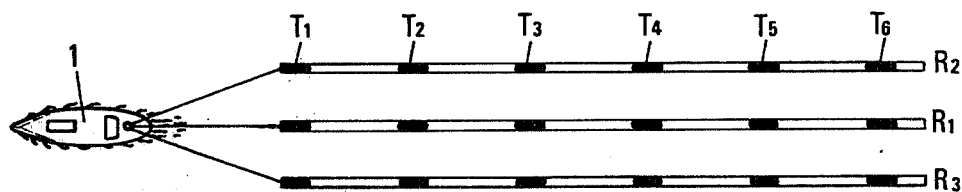

According to the embodiment of FIG. 1, the elongate members consist of seismic streamers of great length $R_1$, $R_2$ and $R_3$, towed behind a ship and laterally shifted with respect to one another.

Figure 2:
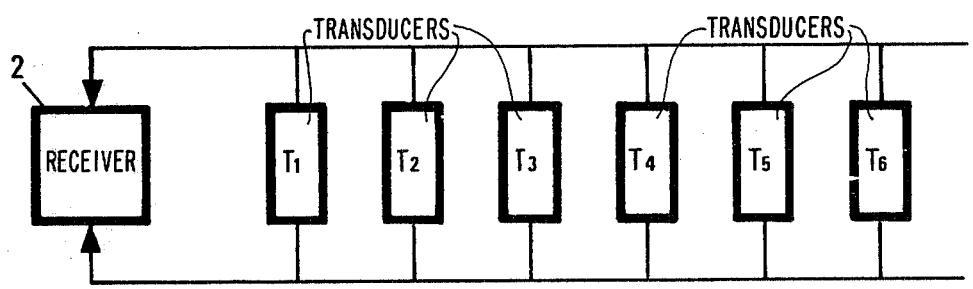

The acoustic telemetrical system comprises an assembly of pressure transducers $T_1, T_2, \ldots T_6$, associated to each seismic streamer. The transducers of each assembly are distributed at regular intervals in each streamer and connected in parallel to an electronic system 2 aboard the ship (FIG. 2).

Figure 3:
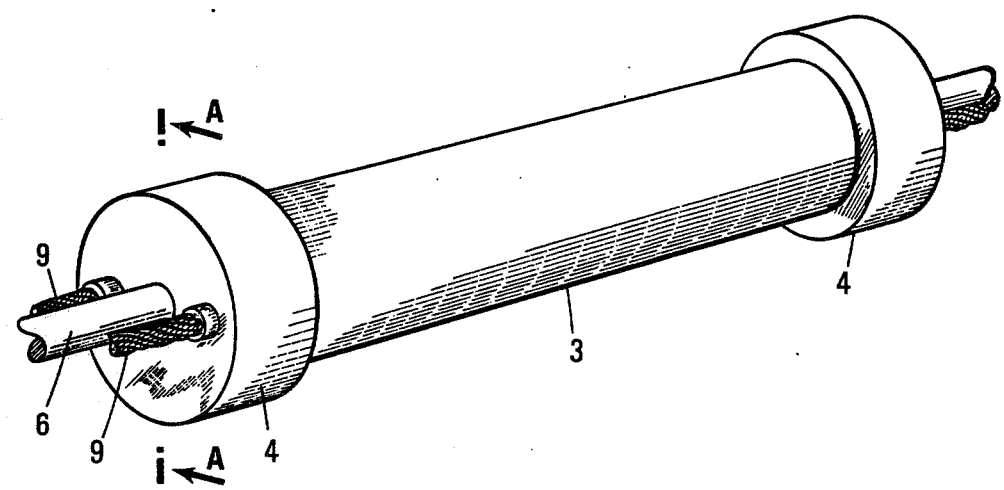
FIG. 3 is a perspective view of a transducing element inside a sheath.
Figure 4:
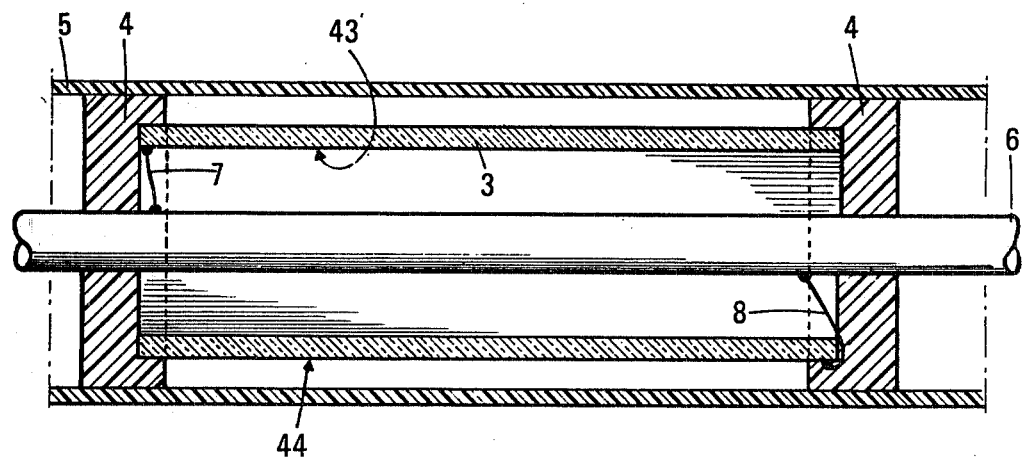
FIG. 4 is a cross-sectional view along line A—A of a transducer located inside the elongate member.

Each transducer comprises (FIGS. 3 and 4), a sensitive element 3 of tubular shape for example and provided with two electrodes 43, 44, respectively in contact with its inner wall and its outer wall. Each of the ends of the sensitive element is fitted into an annular support 4 of elastic material which can be made solid with the external sheath 5 of the seismic streamer.

Inside each sensitive element and in channels transversally crossing supports 4, passes an electric cable 6 to the conductors of which the electrodes 43, 44 of each sensitive element are respectively connected through connecting conductors 7 and 8 as well as through traction cables 9 to which are secured the annular supports 4.

The six cylinders 3 of piezo-electric ceramic of one assembly of transducers, vibrate according to a longitudinal vibration mode, respectively at 6 different frequencies. By way of example, the six frequencies $f_1, f_2 \ldots f_6$ may be respectively selected equal to 22 kHz, 40 kHz, 52.5 kHz, 70 kHz and 93 kHz. These frequencies are selected from those of IRIG (Inter Range Instrumentation Group) standards.

The main vibration frequency of each sensitive element being in reverse proportion to its length, the respective lengths of the sensitive cylinders 3 are determined in dependence with the selected frequencies $f_1, f_2 \ldots f_6$.

The main interest of making use of the longitudinal vibration mode consists in that the transmission angle of cylinder operating according to this mode is independent from the frequency.

As a matter of fact, the transmission angle $2\theta$, expressed in degrees, is given by the relationship:

$$2\theta \simeq 50\lambda/l \quad (1)$$

$l$ being the cylinder length and $\lambda$ the wave length, related to the frequency $f_r$ according to the relationship:

$$\lambda = c/f_r \quad (2)$$

In this relationship c is the propagation velocity and $f_r$ the resonance frequency.

As frequency $f_r$ is in reverse proportion to the length ($f_r \simeq c/2l$), it follows that the transmission angle $2\phi$ is substantially equal to 100°.

The operation of the piezo-electric sensitive elements being reversible, the assembly of transducers associated to a streamer may be used for transmitting acoustic signals or for receiving them. The function of each assembly is determined by its connection either to a transmitting device or to a receiving device.

The central seismic streamer $R_1$ (FIG. 1) is for example connected to a transmission assembly and streamers ($R_2$, $R_3$), on both sides thereof, are connected for example to receiving assemblies 2 (FIG. 2).

Due to the use of multiplexing for transmission and reception, the transducers of each assembly, irrespective of their number, may be connected in parallel to only two conductors.

The transmission assembly 10 (FIG. 5) comprises a modulator M6V (11) controlled by a synchronizer 12. The modulator comprises a number of channels equal to the number of transmitting transducers, in this case six. Upon actuation by synchronizer 12, modulator 11 generates, with a determined recurrence period, a pulse consisting of a continuous sequence of signals at frequencies $f_1, f_2 \ldots f_6$. The generated signals are amplified in an aperiodical amplifier APE (13) and then transferred to transmitting transducers arranged in the central seismic streamer $R_1$ and are transmitted in the form of a sequence of acoustic pulses.

The acoustic signals successively received by the transducers of each seismic streamer $R_2$ and $R_3$ are transmitted to receiver 2 (FIG. 2) which comprises, on each of the two receiving channels, an aperiodical amplifier with adjustable gain 14 (FIG. 6) whose output is connected to the inputs of a six-channel demultiplexer 15, constituted of band-pass filters directing the amplified signals respectively on six output channels corresponding to the six frequencies $f_1, f_2 \ldots f_6$ and an assembly 16 of six echo sensors receiving respectively signals $A_1, A_2 \ldots A_6$ from modulator M6V (11).

A measuring assembly 17, comprising twelve digital telemeters of a known type, receives signals produced by the echo sensors of each receiving channel and measures the travel time of the signals at frequencies $f_1, f_2 \ldots f_6$ received by the transducers of the two seismic streamers. The values measured for the travel times are used in a calculating and viewing assembly 24 to determine the distances between the transmitting and receiving transducers and to display the relative position of the three seismic streamers with respect to one another.

As described more precisely hereinafter, synchronizer 12 produces signals defining instants $SV_1, SV_2 \ldots SV_{12}$ (in short $SV_{1-12}$) at which the telemeters have to transmit to the assembly 24 the measured travel times and the time intervals $CM_1, CM_2 \ldots CM_6$ (in short $CM_{1-6}$) for measures on the received signals, and a signal TBEM controlling the beginning of the transmission by modulator 11. At each change of the transmission frequency, the modulator transmits to the synchonizer the successive signals $TB_1, TB_2 \ldots TB_6$ (in short $TB_{1-6}$).

Each echo sensor of assembly 16 comprises (FIG. 7) a first demodulator 18 receiving on a first input one of the received signals whose frequency $f_i$ is selected by a multiplexer 15 among frequencies $f_1, f_2 \ldots f_6$, and a reference signal $A_i = A_o \cos 2\pi f_i t$ produced by modulator 11, $A_i$ being of the signals $A_1, A_2 \ldots A_6$, the received signal being in the form $E \cos (2\pi f_i t + \phi_i)$ and $\phi_i$ being the phase shift due to the propagation of the acoustic signals transmitted at frequency $f_i$, the demodulator 18 mutiplies the received signal by the reference signal and a low-pass filter 19 separates from the signal produced by said demodulator a signal of amplitude $EA_o/2 \cos \phi_i$. A second demodulator 21 similarly mutiplies the received signal, shifted by 90°, in a shift phase operator 20, by the reference signal and a second low-pass filter 22 selects a signal of amplitude $EA_o/1 \sin \phi_i$.

The signals produced by the two low-pass filters are added in a summing unit 23 producing a signal of amplitude $EA_o/2 (\sin \phi_i + \cos \phi_i)$. An echo sensor 16 produces an output signal only when an echo signal is sensed by one of the receiving chains.

The calculating and viewing assembly 24 (FIG. 8) comprises a calculator 25 and a viewing system 16 comprising for example an oscilloscope connected to a control device with a keyboard 27. The latter comprises keys S for selecting a couple of transmitting-receiving transducers amoung the twelve couples of transducers of the two seismic streamers $R_2, R_3$ and for controlling the display of data obtained from this couple and a key OP for transmitting a manual operation. The viewing system 26 and the calculator 25 are connected to synchronizer 12 through an OR gate 29.

A bus cable 28 connects the assembly of telemeters 17 to calculator 25 and to the viewing device 26. The data calculated by the telemeters may be used in the calculator for proceeding to various operations such, for example, as a first order recursive filtering, according to the needs of the operator.

A manual control signal OP of the operator, issued from the viewing system, or an automatic pulse produced by a clock inside calculator 25 are directed to the synchronizer 12 through said OR gate and constitutes an order referred to as TBEX (FIG. 9). The six-channel modulator M6V (11) and the synchronizer 12 are synchronized by an external clock H (30) of frequency $f_o$. At the beginning of each transmitting-receiving cycle, synchronizer 12 transfers to calculator 25 and to the viewing device 26 a signal IT.

The modulator 11 comprises (FIG. 10) an assembly of dividing counters 31 which divide the frequency of the reference signal produced by clock 30 by predetermined numbers $2N_1, 2N_2 \ldots 2N_6$ and simultaneously produce six signals $A_1, A_2, \ldots A_6$ of respective frequencies $f_1, f_2, \ldots f_6$ used in assemblies 16 of echo sensors (FIG. 6). The dividing counters are connected to a digital multiplexer MXN (32) which, upon successive actuations by an address counter CAD (38) sequentially delivers six signals at frequencies $f_1, f_2 \ldots f_6$ to six different output channels. The increment of the address counter is controlled by a comparator 36 connected, on the one hand, to an internal register of a memory 37. Reference values read on successive addresses of the memory are transferred to the register on actuation by the address counter 38. The comparator 36 is connected, on the other hand, to the output of a counter 35 whose input is connected to a multiplexer output 32, delivering a sequence of signals at frequencies $f_1, f_2 \ldots f_6$.

The address counter 38 also controls a decoding device 39 and an analogical multiplexer MXA (34) which is connected to the outputs of the digital multiplexer MXN through an assembly of filters 33. These filters have for object to transform the successive square signals produced by the digital mutiplexer to sinusoidal signals.

The operation of the modulator is as follows:

Upon actuation by a signal TBEM (FIG. 9) produced by synchronizer 12, the address counter is incremented and controls, on the one hand, the transfer of a first predetermined value to the register associated with memory 37 and, on the other hand, the switching of the digital mutliplexer 32 and of the analogical multiplexer onto the signal at frequency $f_1$. It results in a transfer of signals at frequency $f_1$ to counter 35 which is incremented up to a value identical to that entered in the register associated to memory 37. The signal at frequency $f_1$, made sinusoidal through a filter of assembly 33, is transferred to amplifier 13 (APE) (FIG. 5) through two multiplexers 32 and 34.

When comparator 36 detects the equality between the contents of counter 35 and of the register associated to memory 37, it generates a pulse which increments the address counter 38 by one unit and switches the two multiplexers 32 and 34 on the signal at frequency $f_2$. The preceding cycle is repeated up to the end of the sixth cycle where the operation of the modulator is stopped until arrival of another TBEM pulse generated by synchronizer 12. The pulses emitted by the address counter 38 at the end of the preceding cycles, result in the emission by decoder 39 of pulses $TB_1, TB_2 \ldots TB_6$ (FIG. 9) which are transferred to synchronizer 12 and define the successive emission end instants of signals at frequency $f_1, f_2 \ldots f_6$ (FIG. 9).

Synchronizer 12 comprises (FIG. 11) a dividing counter 40 connected to clock 30 and producing pulses whose frequency is a submultiple of that of the clock. The dividing counter 40 feeds a decoder 41 producing, with a recurrence period equal to the interval between two successive emission steps, a sequence of pulses. The output with reference 0 of the dividing counter generates pulse IT which controls a first input of each of the six bistable flip-flops of an assembly 42. The second input of the flip-flops is respectively controlled through signals $TB_1, TB_2 \ldots TB_6$, generated by decoder 39.

The outputs with references 1 to 12 respectively generate signals $SV_1, SV_2 \ldots SV_{12}$ transferred to the assembly of telemeters 17. The output designated by references 15 generates a recurrent signal TBEM which defines the instant of the beginning of each emission step.

Signals $SV_1, SV_2 \ldots SV_{12}$ define the respective instants at which telemeters 17 are ordered to transmit to assembly 24 the travel times they have measured.

The flip-flops of assembly 42 are triggered, on the one hand, by the respective pulses $TB_1, TB_2 \ldots TB_6$ and, on the other hand, by pulse IT. The square-shaped signals $CM_1, CM_2 \ldots CM_6$, delimited by the outputs from flip-flops (FIG. 9) are transferred to the assembly of telemeters 17 (FIG. 6) and delimitate the time intervals during which the latter are allowed to proceed to measurements on received signals.

What I claim is:

1. A device for determining the relative position of at least a first elongate member with respect to a second elongate member, both members being towed behind a ship, comprising a plurality of devices for transmitting acoustic pulses, distributed along said second member, a plurality of devices for receiving transmitted acoustic pulses, distributed along said first member and a telemetrical system for measuring the relative distance between the elongate members by determination of the travel times of acoustic pulses between said transmitting devices of said second elongate member and said receiving devices of said first elongate member, and wherein each transmitting device includes means for selectively transmitting signals at a respective determined frequency and each receiving device includes means to selectively sense acoustic signals issued from a single transmitting device.

2. A device according to claim 1, wherein the transmission devices and the receiving devices are respectively interconnected in parallel on common conductors.

3. A device according to claim 2, wherein the telemetry system comprises means for amplifying received signals, separating means for directing said received signals respectively onto different output channels according to their frequencies, means for measuring time intervals of propagation of the transmitted acoustic pulses, means for veiwing the calculated distances and synchronizing means.

4. A device according to claim 3, wherein the synchronizing means comprise devices, controlled by a clock member, for generating sequences of pulses defining the instants at which the transmission begins as well as reception and detection time intervals of the received signals.

5. A device according to claim 2, wherein the transmission devices and the receiving devices comprise sensitive elements adapted for operation as transmitting elements and as receiving elements.

6. A device according to claim 3, wherein the separating means comprise separating filters and sensors of the received signals.

7. A device according to claim 3, further comprising means for processing data produced by said measuring means.

8. A device for determining the relative position of at least a first elongate member with respect to a second elongate member, both members being towed beyind a ship, comprising a plurality of devices for transmitting acoustic pulses, distributed along said second member, a plurality of devices for receiving transmitted acoustic pulses, distributed along said first member and a telemetrical system for measuring the relative distance between the elongate members by determination of the travel times of acoustic pulses between said transmitting devices of said second elongate member and said receiving devices of said first elongate member, wherein each transmitting device is adapted to selectively transmit signals at a determined frequency and each receiving device is adapted to selectively sense acoustic signals issued from a single transmitting device, wherein the transmission devices and the receiving devices are respectively interconnected in parallel on common conductors, and wherein the transmission system comprises modulation means, controlled by a clock member, for simultaneously generating signals at different frequencies, means controlled by comparison devices for sequentially producing said signals at different frequencies and amplification means.

9. A device according to claim 8, wherein the comparison members comprise an element for counting signals at different frequencies, an element for memorizing series of values and a comparator for detecting the equality between counting values and memorized values.

10. A device according to claim 8, wherein the transmission devices and the receiving devices comprise cylinders of piezo-electric material adapted to vibrate according to a longitudinal vibration mode.

* * * * *